United States Patent
Li

(10) Patent No.: US 9,100,935 B2
(45) Date of Patent: Aug. 4, 2015

(54) METHOD AND APPARATUS FOR TIME DIVISION DUPLEX UPLINK-DOWNLINK CONFIGURATION CHANGE IN A WIRELESS COMMUNICATION SYSTEM

(71) Applicant: INNOVATIVE SONIC CORPORATION, Taipei (TW)

(72) Inventor: Ming-Che Li, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 184 days.

(21) Appl. No.: 13/958,995

(22) Filed: Aug. 5, 2013

(65) Prior Publication Data
US 2014/0036719 A1    Feb. 6, 2014

Related U.S. Application Data

(60) Provisional application No. 61/679,935, filed on Aug. 6, 2012.

(51) Int. Cl.
| | | |
|---|---|---|
| *H04W 74/00* | (2009.01) | |
| *H04L 1/00* | (2006.01) | |
| *H04W 76/00* | (2009.01) | |
| *H04L 1/18* | (2006.01) | |

(52) U.S. Cl.
CPC ............ *H04W 74/006* (2013.01); *H04L 1/00* (2013.01); *H04L 1/1864* (2013.01); *H04L 1/1896* (2013.01); *H04W 76/00* (2013.01)

(58) Field of Classification Search
CPC .. H04W 74/006; H04W 76/00; H04L 1/1896; H04L 1/1864; H04L 1/00
USPC ........................................................ 370/254
See application file for complete search history.

(56) References Cited

U.S. PATENT DOCUMENTS

| | | | | |
|---|---|---|---|---|
| 2013/0194980 A1* | 8/2013 | Yin et al. | ....... | 370/280 |
| 2014/0022962 A1* | 1/2014 | Yang et al. | ....... | 370/280 |
| 2014/0204854 A1* | 7/2014 | Freda et al. | ....... | 370/329 |
| 2014/0293842 A1* | 10/2014 | He et al. | ....... | 370/280 |

FOREIGN PATENT DOCUMENTS

WO    WO 2013005991 A3 *  1/2013

OTHER PUBLICATIONS

R1-122807, 'Methods to Support Different Time Scales for Reconfiguration', 3GPP TSG RAN WG1 Meeting #69, May 21-25, 2012, pp. 1-3.*
R1-130130, 'HARQ timing in TDD-eIMTA', 3GPP TSG RAN WG1 Meeting #72, Jan. 28-Feb. 1, 2013, pp. 1-3.*

* cited by examiner

*Primary Examiner* — Melvin Marcelo
(74) *Attorney, Agent, or Firm* — Blue Capital Law Firm, P.C.

(57) ABSTRACT

A method and apparatus are disclosed for changing Time Division Duplex (TDD) Uplink (UL)-Downlink (DL) configuration. According to one embodiment, the method includes receiving by the UE a signaling for TDD UL-DL reconfiguration and changes from an old TDD UL-DL configuration to a new TDD UL-DL configuration. The method further includes considering by the UE before a specific timing that a number of Physical Hybrid ARQ Indicator Channel (PHICH) groups is determined by the old UL-DL configuration at least for overlapped non-UL subframes between the new TDD UL-DL configuration and the old TDD UL-DL configuration.

22 Claims, 5 Drawing Sheets

METHOD AND APPARATUS FOR TIME DIVISION DUPLEX UPLINK-DOWNLINK CONFIGURATION CHANGE IN A WIRELESS COMMUNICATION SYSTEM

CROSS-REFERENCE TO RELATED APPLICATIONS

The present Application claims the benefit of U.S. Provisional Patent Application Ser. No. 61/679,935 filed on Aug. 6, 2012, the entire disclosure of which is incorporated herein by reference.

FIELD

This disclosure generally relates to wireless communication networks, and more particularly, to a method and apparatus for Time Division Duplex (TDD) uplink-downlink configuration change in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed for changing Time Division Duplex (TDD) Uplink (UL)-Downlink (DL) configuration. According to one embodiment, the method includes receiving by the UE a signaling for TDD UL-DL reconfiguration and changes from an old TDD UL-DL configuration to a new TDD UL-DL configuration. The method further includes considering by the UE before a specific timing that a number of Physical Hybrid ARQ Indicator Channel (PHICH) groups is determined by the old UL-DL configuration at least for overlapped non-UL subframes between the new TDD UL-DL configuration and the old TDD UL-DL configuration.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including document 3GPP TS 36.211 V10.4.0 (2011-12) "Evolved Universal Terrestrial Radio Access" (hereinafter referred to as TS 36.211); document RP-110450, "New study item proposal for Further Enhancements to LTE TDD for DL-UL Interference Management and Traffic Adaptation" (hereinafter referred to as RP-110450); document 3GPP TR 36.828 V2.0.0 (2012-06) "Further Enhancements to LTE TDD for DL-UL Interference Management and Traffic Adaptation" (hereinafter referred to as TS 36.828-200); document R1-122807, "Methods to Support Different Time Scales for Reconfiguration" (hereinafter referred to as R1-122807); and document 3GPP TS 36.331 V10.5.0, "E-UTRA RRC protocol specification (Release 10)" (hereinafter referred to as TS 36.331). The standards and documents listed above are hereby expressly incorporated herein.

Figure 1:
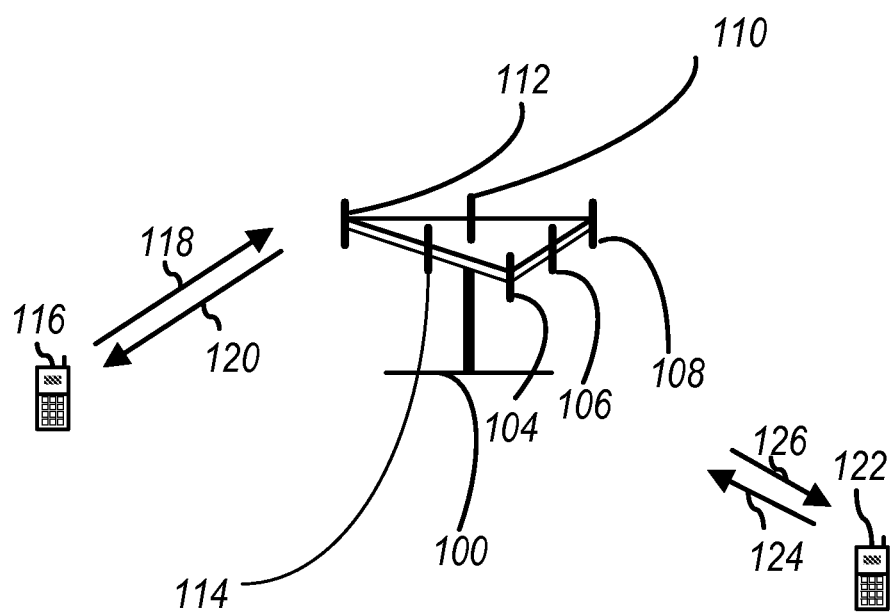
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
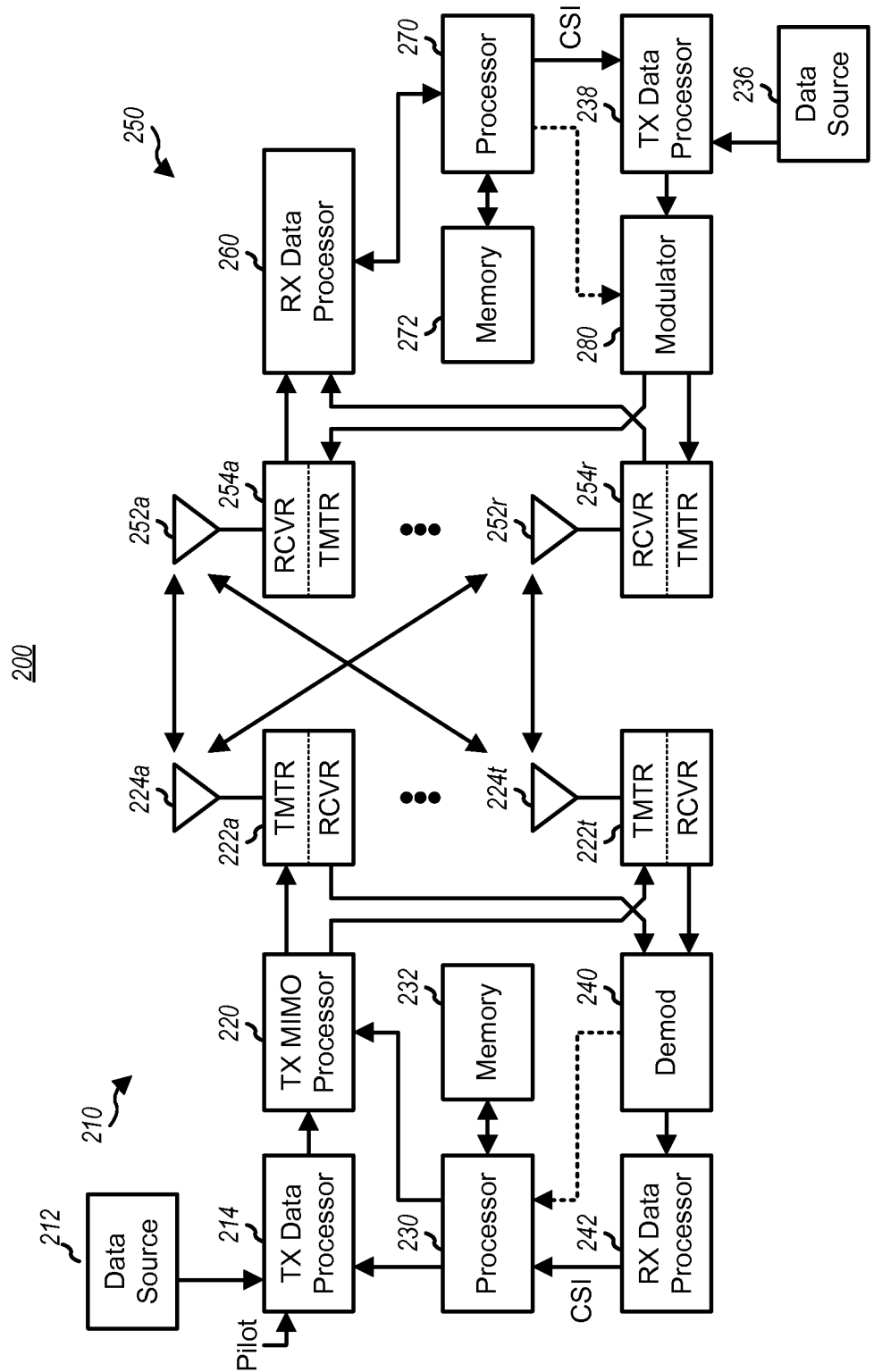
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
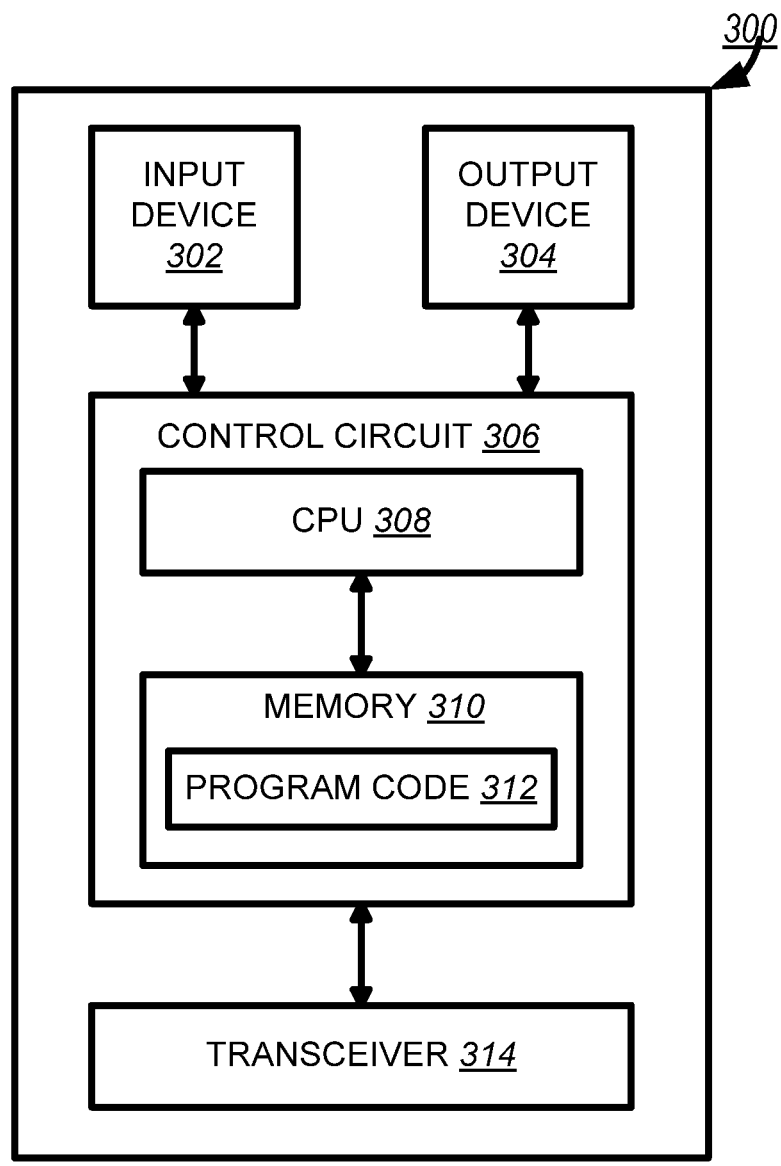
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
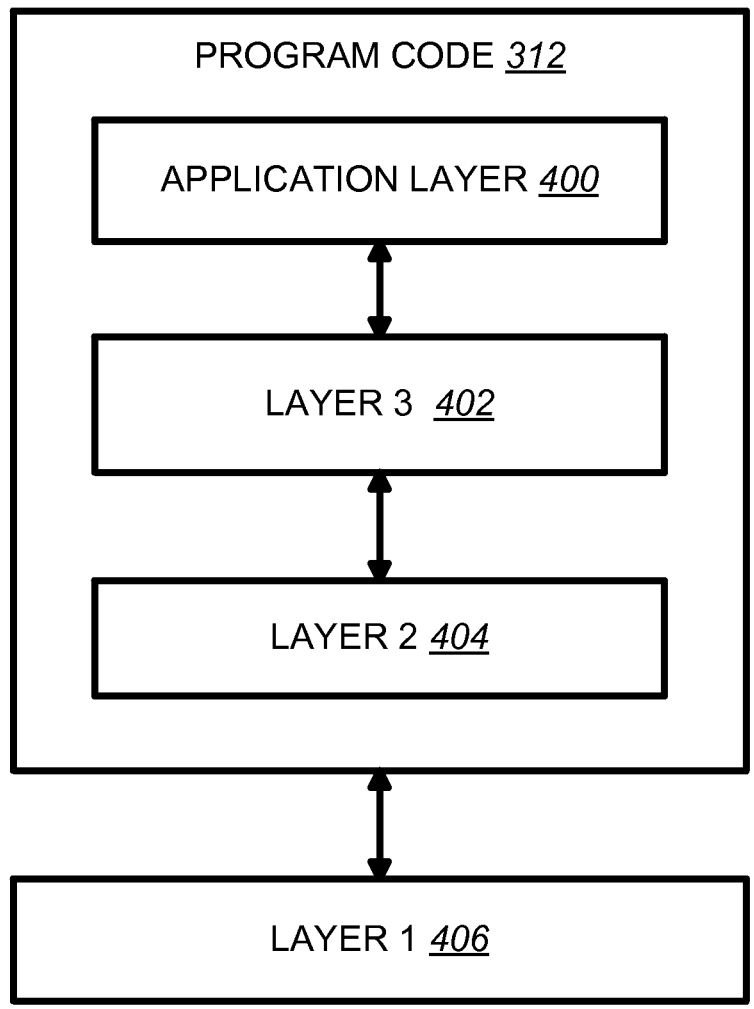
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

The subframe structures of Time Division Duplex (TDD) uplink (UL)-downlink (DL) configurations are defined in Table 1, which is reproduced from TS 36.211:

TABLE 1

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Each subframe in a radio frame "D" denotes the subframe is reserved for downlink transmissions, "U" denotes the subframe is reserved for uplink transmissions and "S" denotes a special subframe with the three fields Downlink Pilot Time Slot (DwPTS), Guard Period (GP) and Uplink Pilot Time Slot (UpPTS).

Currently, LTE TDD allows for asymmetric UL-DL allocations by providing seven different semi-statically configured uplink-downlink configurations. These allocations can provide between 40% and 90% DL subframes. The semi-static allocation may or may not match the instantaneous traffic situation. RP-110450 proposed to enhance LTE TDD for DL-UL Interference Management and Traffic Adaptation by evaluating the benefits of uplink-downlink re-configuration depending on traffic conditions and assessing the appropriate time scale for uplink-downlink re-configuration.

TR 36.828-200 described the progress of the study item proposed by RP-110450. Depending on the required adaptation time scales, different methods can be considered for Time Division Duplex (TDD) Uplink-Downlink (UL-DL) reconfiguration. Examples of such methods are system information signaling, dedicated Radio Resource Control (RRC) signaling, Medium Access Control (MAC) Control Element signaling, and physical layer signaling. The time scales for these four methods may be on the order of 640 millisecond (ms) (or larger), 200 ms, a few tens of ms, and 10 ms, respectively.

R1-122807 addressed the potential interference issues for two adjacent cells deploying different TDD configurations. For the subframe where U and D have a mismatch, eNB-to-eNB or UE-to-UE interference is possible, which can be managed to some extent by eNB implementation (e.g. via inter-eNB coordination) if the time scale of the change is not too large. However, if the time scale is on the order of 10 ms, the implementation based solution for interference avoidance may not be possible. Thus, according to R1-122807, to allow implementation based interference avoidance, it would be more beneficial to have slower adaptation rate for TDD UL-DL reconfiguration.

According to TS 36.211, within the Orthogonal Frequency Division Multiplexing (OFDM) symbols indicated by Physical Control Format Indicator Channel (PCFICH), the PDCCHs are mapped to physical resources (resource-element groups) not assigned to Cell-specific Reference Signal CRS or PCFICH or (Physical Hybrid ARQ Indicator Channel (PHICH). Since the number of PHICH groups $m_i \cdot N_{PHICH}^{group}$ may vary between different DL/special subframes (i.e. in, may be 0 or 1 or 2 as specified in Table 6.9-1 of TS 36.211), the PDCCH mapping would change subframe by subframe. If dedicated RRC signaling, MAC Control Element signaling or physical layer signaling is utilized to reconfigure TDD UL-DL configuration for the new UEs, there exists a transition period where legacy UEs and the new UEs have different understanding of TDD UL-DL configuration. Additionally, the legacy UEs and the new UEs have different understanding of the PHICH groups number and PDCCH mapping. Accordingly, scheduling PDCCHs by the network may be complex.

According to TR 36.828-200, simulation result shows that faster TDD UL-DL reconfiguration time scale provides larger benefits than slower TDD UL-DL reconfiguration time scale based on traffic adaptation. In addition to any potential Physical Downlink Shared Channel (PDSCH)/Physical Uplink Share Channel (PUSCH) Hybrid Automatic Repeat and request (HARQ) timeline related issues that may arise, legacy UEs and the new UEs would have different understanding of the PHICH groups number and PDCCH mapping during the above-noted transition period since the new UEs may receive the TDD UL-DL reconfiguration signaling and apply the new TDD UL-DL reconfiguration earlier than legacy UEs. For instance, the new UEs apply the new TDD UL-DL configuration within the modification period of change notification, and legacy UEs wait until acquiring the updated system information in the next modification period.

According to one embodiment, the new UEs consider the number of PHICH groups and PDCCH mapping following the old TDD UL-DL configuration, at least for the overlapped non-UL subframes between new and old TDD UL-DL configurations. The number of PHICH groups and PHICH duration may be also determined by the PHICH configuration (configured by RRC), including PHICH parameters phich-Resource and phich-Duration, which are described in TS 36.331 and TS 36.211. In the transition period, legacy UEs and the new UEs may have the different understanding if the signaling for TDD UL-DL reconfiguration also indicates a new PHICH configuration. According to another embodiment, the new UEs consider the number of PHICH groups and PHICH duration following the old PHICH configuration, at least for the overlapped non-UL subframes between new and old TDD UL-DL configurations.

Figure 5:
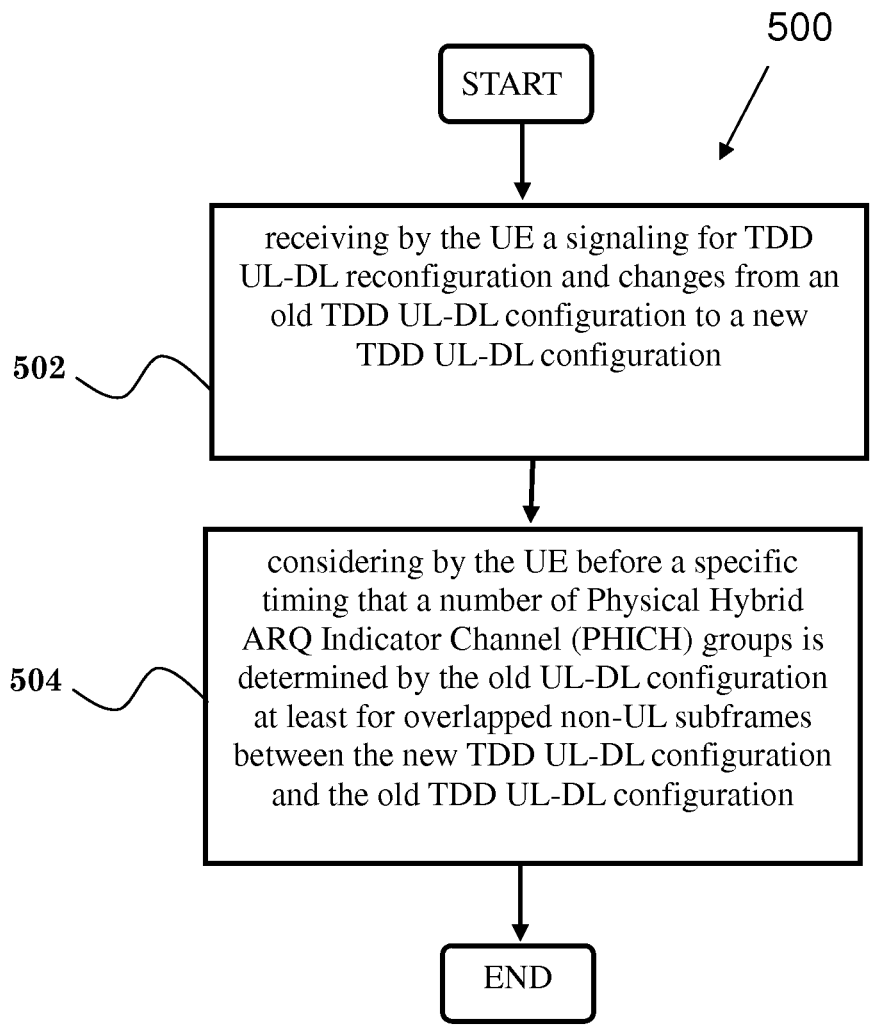
FIG. 5 is a flow chart according to one exemplary embodiment.

FIG. 5 shows a flowchart for a method 500 of changing TDD UL-DL configuration according to one embodiment. In step 502, a UE receives a signaling for TDD UL-DL reconfiguration and changes from an old TDD UL-DL configuration to a new TDD UL-DL configuration. In step 504, before a specific timing, the UE considers that the number of PHICH groups is determined by the old UL-DL configuration, at least for the overlapped non-UL subframes between the new and old TDD UL-DL configurations. According to one embodiment, the non-UL subframe may mean DL subframe or special subframe.

According to one embodiment, if the UE receives the signaling in a modification period n, then the specific timing is the start of the next modification period, i.e. n+1. The signaling for TDD UL-DL reconfiguration and changes from an old TDD UL-DL configuration to a new TDD UL-DL configuration may be a dedicated RRC signaling. Alternatively, the signaling may be a MAC Control Element signaling. Alternatively yet, the signaling may be a physical layer signaling.

In one embodiment, the specific timing may be the expected first timing where the new TDD UL-DL configuration is signaled from system information. In another embodiment, the specific timing may be the expected timing where legacy UEs acquire or apply the new TDD UL-DL configuration. The legacy UEs may acquire the new TDD UL-DL configuration from system information. The specific timing may be indicated or signaled by the the signaling for TDD UL-DL reconfiguration and changes from an old TDD UL-DL configuration to a new TDD UL-DL configuration.

According to one embodiment, if a subframe m is UL subframe in old TDD UL-DL configuration but is DL subframe in new TDD UL-DL configuration, the UE considers that the number of PHICH groups is determined by the new UL-DL configuration in the subframe m. According to another embodiment, after the specific timing, the UE considers that the number of PHICH groups is determined by the new UL-DL configuration in all DL or special subframes.

According to one embodiment, the signaling for TDD UL-DL reconfiguration and changes from an old TDD UL-DL configuration to a new TDD UL-DL configuration may also indicate a new PHICH configuration. Before a specific timing, the UE may consider that the number of PHICH groups and/or PHICH duration is determined by the old PHICH configuration, at least for the overlapped non-UL subframes between the new and old TDD UL-DL configurations. According to another embodiment, if a subframe in is UL subframe in old TDD UL-DL configuration but is DL subframe in new TDD UL-DL configuration, the UE may consider that the number of PHICH groups and/or PHICH duration is determined by the new PHICH configuration in the subframe m. After the specific timing, the UE may consider that the number of PHICH groups and PHICH duration are determined by the new PHICH configuration in all DL or special subframes. As described above, the PHICH configuration may include phich-Resource or phich-Duration.

According to the one or more embodiments described herein, the complexity of PDCCH scheduling can be avoided during the transition period of TDD UL-DL reconfiguration since the UE considers before a specific timing that the number of PHICH groups is determined by the old UL-DL configuration, at least for the overlapped non-UL subframes between the new and old TDD UL-DL configurations.

Referring back to FIGS. 3 and 4, in one embodiment, the device 300 implements a UE and includes a program code 312 stored in memory 310. In one embodiment, the CPU 308 could execute the program code 312 to enable the UE to receive a signaling for TDD UL-DL reconfiguration and changes from an old TDD UL-DL configuration to a new TDD UL-DL configuration, and before a specific timing, the UE considering that the number of PHICH groups is determined by the old UL-DL configuration, at least for the overlapped non-UL subframes between the new and old TDD UL-DL configurations. In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for changing Time Division Duplex (TDD) Uplink (UL)-Downlink (DL) configuration comprising:
  receiving by the UE a signaling for TDD UL-DL reconfiguration and changes from an old TDD UL-DL configuration to a new TDD UL-DL configuration; and
  considering by the UE before a specific timing that a number of Physical Hybrid ARQ Indicator Channel (PHICH) groups is determined by the old UL-DL configuration at least for overlapped non-UL subframes between the new TDD UL-DL configuration and the old TDD UL-DL configuration.

2. The method of claim 1, wherein if the UE receives the signaling in a modification period, the specific timing is the start of the next modification period.

3. The method of claim 1, wherein the specific timing is an expected first timing the new TDD UL-DL configuration is signaled from system information.

4. The method of claim 1, wherein the specific timing is an expected timing legacy UEs acquire or apply the new TDD UL-DL configuration.

5. The method of claim 4, wherein the legacy UEs acquire the new TDD UL-DL configuration from system information.

6. The method of claim 1, wherein the specific timing is indicated or signaled by the signaling.

7. The method of claim 1, wherein the signaling is one of a dedicated Radio Resource Control (RRC) signaling, a Medium Access Control (MAC) Control Element signaling or a physical layer signaling.

8. The method of claim 1, further comprising at least one of:
the UE considering that the number of PHICH groups is determined by the new UL-DL configuration in a subframe m if the subframe m is a UL subframe in the old TDD UL-DL configuration but is a DL subframe in the new TDD UL-DL configuration; or
the UE considering after the specific timing that the number of PHICH groups is determined by the new UL-DL configuration in all DL or special subframes.

9. The method of claim 1, wherein the signaling further indicates a new PHICH configuration and wherein a PHICH configuration includes phich-Resource or phich-Duration.

10. The method of claim 9, further comprising at least one of:
the UE considering before the specific timing that at least the number of PHICH groups or PHICH duration is determined by an old PHICH configuration at least for the overlapped non-UL subframes between the new and old TDD UL-DL configurations;
the UE considering that at least the number of PHICH groups or PHICH duration is determined by a new PHICH configuration in a subframe m if the subframe m is a UL subframe in the old TDD UL-DL configuration but is a DL subframe in the new TDD UL-DL configuration; or
the UE considering after the specific timing that the number of PHICH groups and PHICH duration are determined by a new PHICH configuration in all DL or special subframes.

11. The method of claim 1, wherein the non-UL subframe is a DL subframe or special subframe.

12. A UE (User Equipment) in a wireless communications system comprising:
a control circuit;
a processor installed in the control circuit;
a memory installed in the control circuit and coupled to the processor;
wherein the processor is configured to execute a program code stored in memory to change Time Division Duplex (TDD) Uplink (UL)-Downlink (DL) configuration by:
receiving by the UE a signaling for TDD UL-DL reconfiguration and changes from an old TDD UL-DL configuration to a new TDD UL-DL configuration; and
considering by the UE before a specific timing that a number of Physical Hybrid ARQ Indicator Channel (PHICH) groups is determined by the old UL-DL configuration at least for overlapped non-UL subframes between the new TDD UL-DL configuration and the old TDD UL-DL configuration.

13. The UE of claim 12, wherein if the UE receives the signaling in a modification period, the specific timing is the start of the next modification period.

14. The UE of claim 12, wherein the specific timing is an expected first timing the new TDD UL-DL configuration is signaled from system information.

15. The UE of claim 12, wherein the specific timing is an expected timing legacy UEs acquire or apply the new TDD UL-DL configuration.

16. The UE of claim 15, wherein the legacy UEs acquire the new TDD UL-DL configuration from system information.

17. The UE of claim 12, wherein the specific timing is indicated or signaled by the signaling.

18. The UE of claim 12, wherein the signaling is one of a dedicated Radio Resource Control (RRC) signaling, a Medium Access Control (MAC) Control Element signaling or a physical layer signaling.

19. The UE of claim 12, further comprising at least one of:
the UE considering that the number of PHICH groups is determined by the new UL-DL configuration in a subframe m if the subframe m is a UL subframe in the old TDD UL-DL configuration but is a DL subframe in the new TDD UL-DL configuration; or
the UE considering after the specific timing that the number of PHICH groups is determined by the new UL-DL configuration in all DL or special subframes.

20. The UE of claim 12, wherein the signaling further indicates a new PHICH configuration and wherein a PHICH configuration includes phich-Resource or phich-Duration.

21. The UE of claim 20, further comprising at least one of:
the UE considering before the specific timing that at least the number of PHICH groups or PHICH duration is determined by an old PHICH configuration at least for the overlapped non-UL subframes between the new and old TDD UL-DL configurations;
the UE considering that at least the number of PHICH groups or PHICH duration is determined by a new PHICH configuration in a subframe m if the subframe m is a UL subframe in the old TDD UL-DL configuration but is a DL subframe in the new TDD UL-DL configuration; or
the UE considering after the specific timing that the number of PHICH groups and PHICH duration are determined by a new PHICH configuration in all DL or special subframes.

22. The UE of claim 12, wherein the non-UL subframe is a DL subframe or special subframe.

* * * * *